W. H. GRINDALL.
SCALE RELIEVING GEAR.
APPLICATION FILED FEB. 26, 1916.

1,213,355.

Patented Jan. 23, 1917.
3 SHEETS—SHEET 1.

Witness
Daniel Webster Jr.

Inventor
William H. Grindall
By James T. A. Lumbers
his Attorney

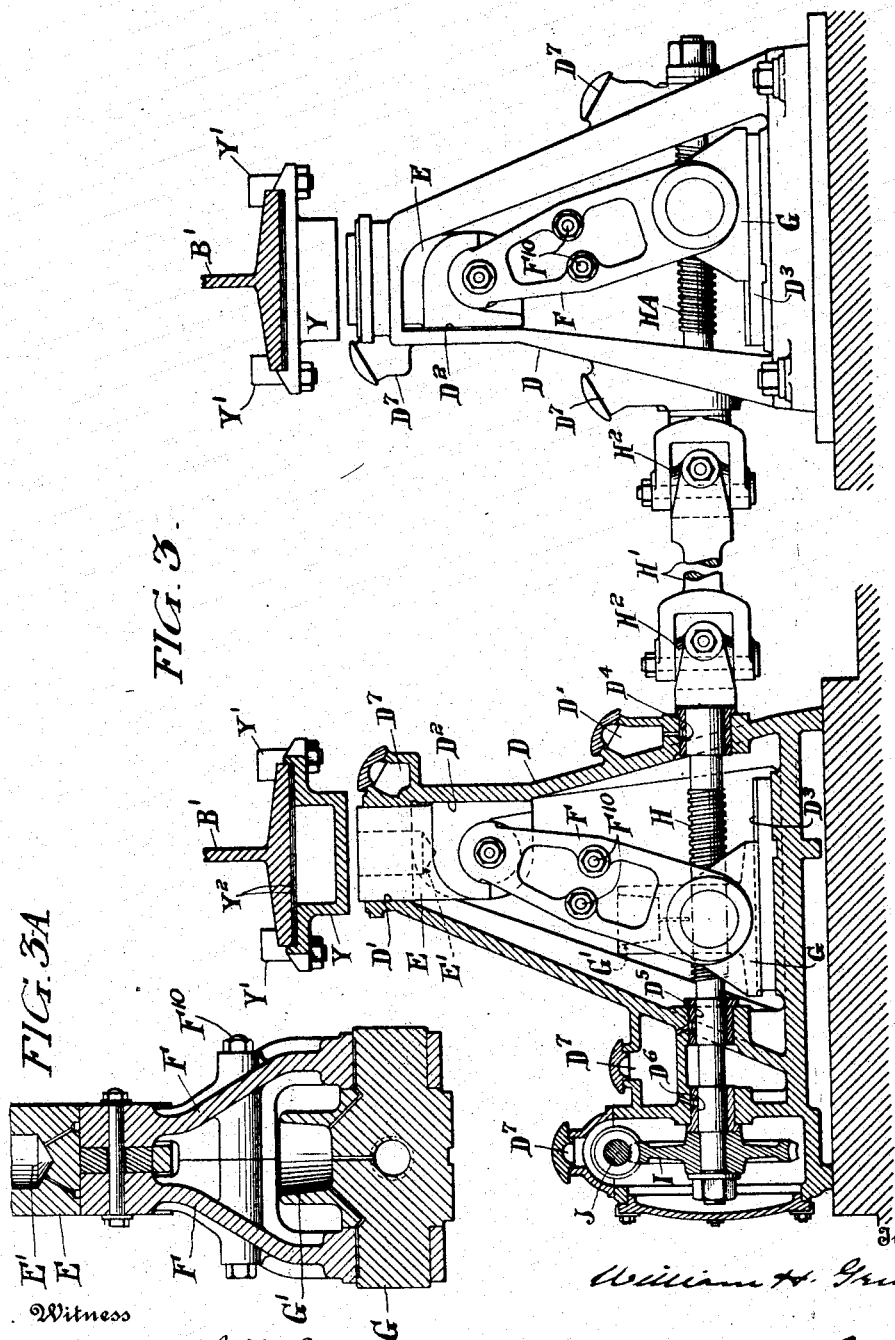

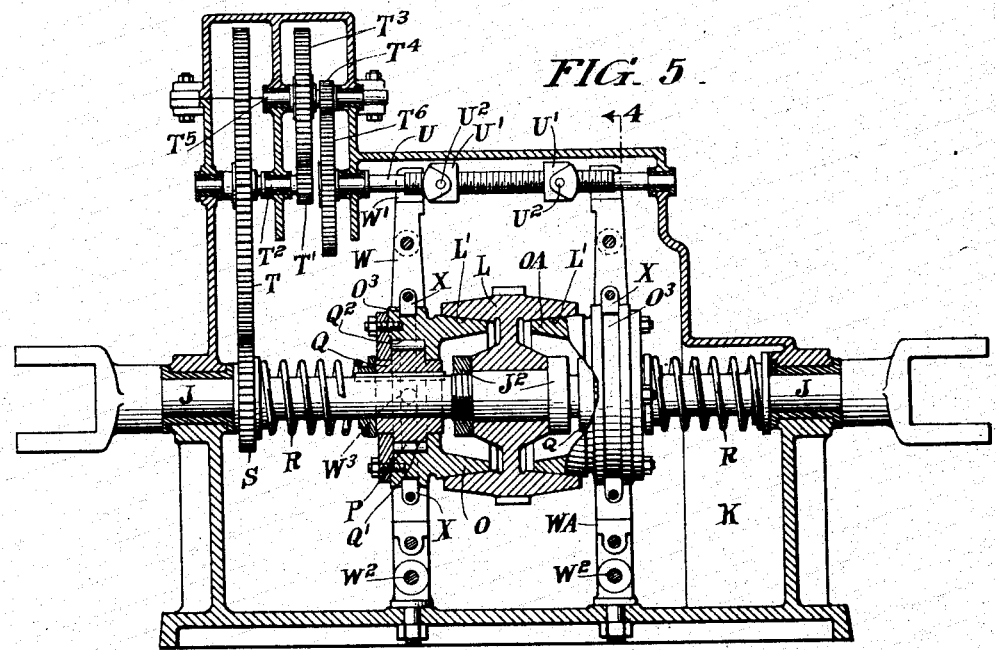
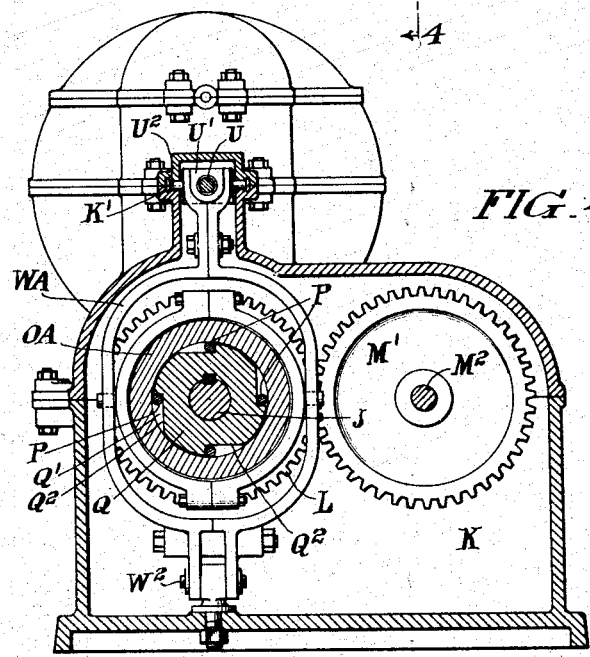

UNITED STATES PATENT OFFICE.

WILLIAM H. GRINDALL, OF ALTOONA, PENNSYLVANIA.

SCALE-RELIEVING GEAR.

1,213,355.   Specification of Letters Patent.   Patented Jan. 23, 1917.

Application filed February 26, 1916. Serial No. 80,584.

*To all whom it may concern:*

Be it known that I, WILLIAM H. GRINDALL, a citizen of the United States of America, and a resident of Altoona, in the county of Blair and State of Pennsylvania, have invented certain new and useful Improvements in Scale-Relieving Gear, of which the following is a true and exact description, reference being had to the accompanying drawings, which form a part thereof.

My present invention relates to platform scales and has for its general object the provision of simple, durable and effective means by which a scale platform may be supported independently of the scale levers and bearings whenever this may be desirable, and which may be adjusted with comparative ease and rapidity to permit the scale to be used in weighing, or to support it in such manner that it cannot be so used.

My invention is particularly adapted for use in connection with railway scales employed to weigh loaded and empty railroad cars standing on, or traveling over the scale platform. In the case of such scales it may be desirable to weigh some or all of the cars, but not the locomotive of a train passing over the scale, while at the same time it may be highly undesirable to subject the scale levers and bearings to the weight of the locomotive. In the case of railway scales also, it is desirable to protect the scale levers and bearings against the unnecessary shock of the passage over the scale platform of trains of cars which do not need to be weighed.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described a preferred form of apparatus embodying my invention.

Figure 1:
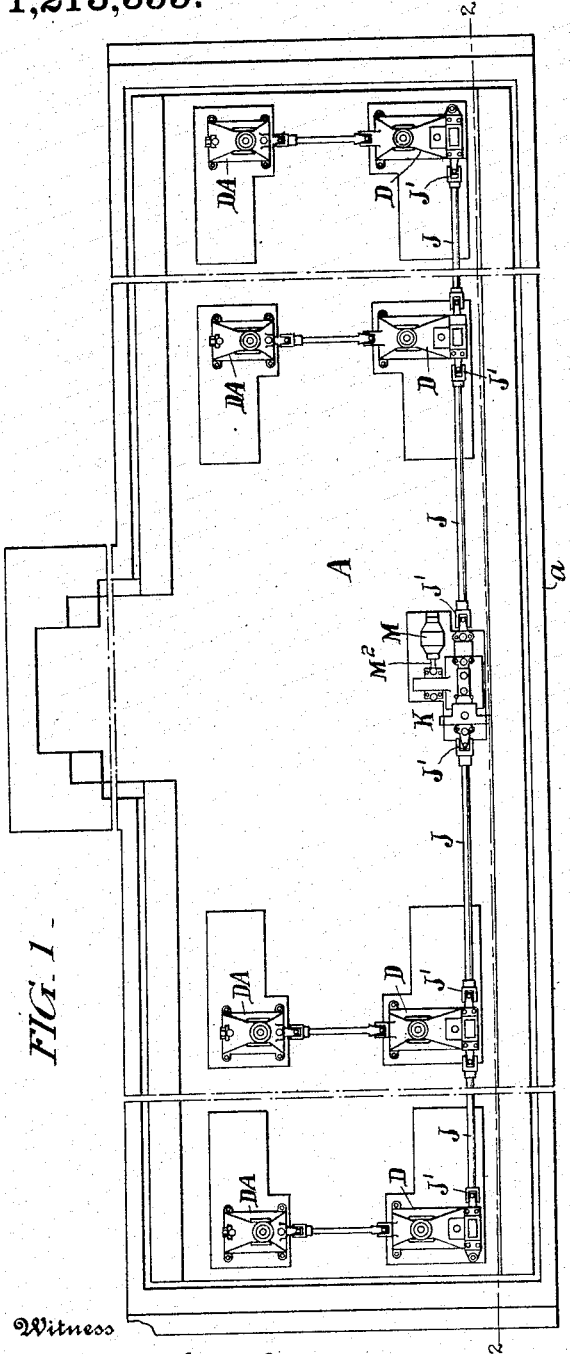
Figure 2:
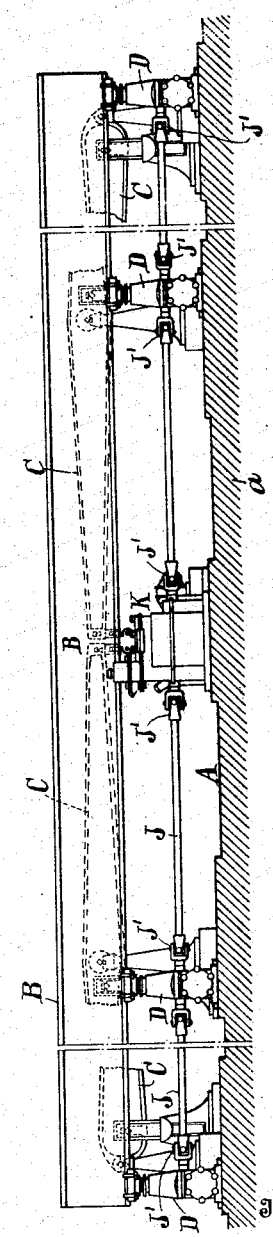

Of the drawings:

Figure 1 is a plan view of a scale pit with my relieving gear installed, but with the scale mechanism proper removed; Fig. 2 is a partial longitudinal section through the scale pit taken on the line 2—2 of Fig. 1, and with parts of the scale mechanism proper in place; Fig. 3 is a transverse sectional elevation through the scale pit with part of the scale relieving mechanism shown in section; Fig. 3$^A$ is an end elevation of a portion of the apparatus shown in Fig. 3; Fig. 4 is an end elevation partly in section on the line 4—4 of Figs. 1 and 5, through the power transmitting mechanism of the scale relieving gear; and Fig. 5 is a sectional elevation taken at right angles to Fig. 4.

In the drawings: A represents the scale pit of a railway platform scale of conventional type, and $a$ represents the masonry forming the bottom and side walls of the scale pit.

C represents the balancing or scale mechanism proper (i. e., the levers, etc.,) by which the scale platform is balanced in the weighing operation. It will be understood that the scale platform and scale mechanism C may be of any usual construction. As shown, the scale platform is of the type in common use in which the supporting frame work comprises two longitudinal beams shown as metallic I-beams B which extend under the scale platform adjacent its opposite side edges from one end of the platform to the other. Disposed under the scale platform at points along the length of the latter are lifting jacks D and DA, and as shown, there are four jacks D located under one of the beams B, and four jacks DA located under the other of these beams. The jacks D and DA are coupled up in pairs as hereinafter explained.

In the preferred construction illustrated, each jack D comprises a casing or housing member formed with a vertical guide bearing D' for the vertically movable plunger E, the upper end of which is adapted to engage the under side of the scale platform. The housing is also formed with a vertical side bearing $D^2$ for the lower end of the member E. The member E is pivotally connected by a link F to a sliding shoe or nut member G which is movable in the direction of the length of the scale platform along a sliding bearing surface $D^3$ formed at the bottom of the housing of the jack D. The housing is also formed with bearings $D^4$, $D^5$ and $D^6$ for a horizontal shaft H which has a screw-threaded portion working in a threaded socket formed for the purpose in the shoe G. The rotation of the shaft H thus serves to move the member G along the bearing $D^3$ and thereby raise and lower the plunger E. At its outer end the shaft H has secured to it a gear wheel I, in mesh with a worm on the main power shaft J of the relieving gear which extends from one end of the scale platform to the other. The links F are each formed in two parts connected by bolts F¹⁰ to facilitate the assemblage of the apparatus. As shown, the housing of the jack D is provided with suitable grease cups D⁷ for lubricating the various bearings formed in the housing, and the plunger E and shoes G are formed with cavities E' and G' respectively for material lubricating the trunnion bearings by which the lever F is connected to the plunger E and shoe G respectively.

The lifting jacks DA are essentially the same in construction as the lifting jacks D, except that in the case of the jack DA, the gear wheel I, the adjacent bearing D⁶, and the bearing for the shaft J of the jack D, are omitted in the case of the jack DA. The screw shaft HA of each jack DA is connected to the shaft H of the corresponding jack D by means of a shaft section H' and the swivel joints H² which are provided to avoid the necessity of absolutely exact alinement of the shafts H and HA of each connected pair of jacks D and DA. Similarly, to avoid necessity for exact alinement of the bearings for the shaft J formed in the housing of the different jacks D, the main shaft J is divided into sections coupled by universal joints J'. The central section of the shaft J passes through the housing of the power transmitting mechanism K by which the shaft J is raised and lowered to transfer the weight of the scale platform and its load back and forth from the plungers E of the jacks D and DA to the scale levers C.

Within the housing of the transmitting mechanism K, the shaft J is provided with collars J² to prevent the endwise displacement of a gear member L which is loosely mounted on the shaft. The gear L is in mesh with the spur gear M' carried by the shaft M² of the reversible electric motor M, which is employed to rotate the gear L and thereby the shaft J, in one direction or the other, accordingly as the plungers E of the jacks D and DA are to be raised or lowered. The mechanism by which the motion of the gear L is transferred to the shaft J comprises friction clutch members O and OA at opposite sides of the gear L and normally held by the springs R in frictional locking engagement with the tapered internal contact surfaces L' of the gear L. The member O is connected to the shaft J by a ratchet clutch mechanism comprising a collar Q splined on the shaft J and surrounded by the member O, and formed with peripheral pockets Q', with inclined walls Q² receiving rollers P which jam between the walls Q² and the member O and thus lock the latter to the shaft J when the gear L and member O are rotated in one direction, but which disengage and permit the member O to turn freely relatively to the shaft J when the gear L and member O are rotated in the opposite direction. The members OA and QA are identical with the members O and Q respectively, except that the pockets Q' in the member QA are so shaped that with the direction of rotation of the gear L in which the member O is locked to the shaft J, the member QA is free from the shaft, while with the opposite direction of rotation, the member QA is locked to the shaft. With the construction described it will be apparent that the shaft J is normally connected to the motor so that the shaft will respond instantly and directly to a rotation in either direction of the motor.

To prevent the possibility of damage from overtravel of the motor M, in case the latter is not stopped when the jack plungers E are moved to the top or bottom limit of their desired range of motion, I have provided mechanism for automatically disconnecting the motor from the shaft J when the jack plungers E have reached either limit of their range of movement. For this purpose a spur gear S is secured to the shaft J within the housing of the device K. The spur gear S operates through the large and small gears T and T' secured to the shaft T², the large and small gears T³ and T⁴ secured to the shaft T⁵, and the gear T⁶ secured to the shaft U to rotate the latter as the shaft J is rotated, but with a greatly reduced angular velocity. The shafts T², T⁵ and U are suitably journaled in the housing of the device K. The shaft U is provided with a screw threaded portion on which, as shown, are two traveling nuts U'. Each of these nuts is provided with trunnion like extensions U² working in the guide-ways K' formed in the transmission housing. This prevents the nuts U' from rotating about the axis of the shaft U. On a predetermined rotation of the shaft J carrying the plungers E to the upper limit of their desired movement, the left hand nut U' engages the forked upper end W' of a lever W and moves the latter to the left. The lever W which has its lower end pivotally connected at W² to the housing of the transmission mechanism, is pivotally connected between its ends to a frame or split collar X loosely received in the circumferential slot O³ formed in the periphery of the member O. The movement thus imparted to the lever W carries the member O out of frictional engagement with the gear L. A lever WA, operatively connected to the member O² as the lever W is connected to the member O, is engaged by the right hand traveling nut U' and thereby caused to move the member OA out of frictional engagement with the gear L when the rotation of the shaft in lowering the jacks as per the plungers E to the lower desired limit of their movement.

Advantageously as shown, the frame work of the scale platform is provided with adjustable contact members Y for engagement by the jack plungers E. As shown, each device Y comprises a cast metal block clamped to the under side of the corresponding I-beam B by the hook bolts Y'. Interposed between the base of the I-beam B and each block Y may be one or more rectangular pieces of sheet metal or shims Y² by which the distance between the bottom face of each block Y and the under side of the corresponding I-beam may be varied as is desired. These shims form simple and effective means by which, notwithstanding the restricted space conditions, adjustments may be easily made to bring the apparatus to, and maintain it in the condition in which the lifting jacks will simultaneously engage the scale platform as the jacks are manipulated to relieve the scale levers of the weight of the scale platform and the load carried by it.

It will be obvious to those skilled in the art that the mechanism described is characterized by extreme simplicity and reliability, and that the provisions made for operatively connecting the different jacks to their common prime mover avoids the necessity for extreme accuracy in setting up the jacks, while at the same time permits of their operation with a comparatively small amount of power. The jack mechanism disclosed is simple and powerful and is especially characterized by its compactness in a vertical direction which is of great practical importance because of the restricted space condition in which the jacks are used.

Having now described my invention, what I claim as new and desire to secure by Letters Patent, is:—

1. In a weighing scale the combination with the platform and the balancing mechanism therefor, of a relieving gear for the latter comprising a plurality of lifting jacks each having a movable actuating member, and being arranged in pairs beneath the scale platform at intervals along the length of the latter, the two jacks of each pair being located at opposite sides of the center line of the platform and comprising a common screw operating shaft, having oppositely threaded portions in threaded engagement respectively, with the movable actuating members of the two jacks, and a shaft extending longitudinally of the platform and gear connected to one end of each of said screw operating shafts.

2. In a weighing scale the combination with the platform and the usual balancing mechanism therefor, of a relieving gear for the latter comprising a plurality of lifting jacks each having a movable actuating member, and being arranged in pairs beneath the scale platform at intervals along the length of the latter, the two jacks of each pair being located at opposite sides of the center line of the platform and comprising a common screw operating shaft having oppositely threaded portions in threaded engagement respectively, with the movable actuating members of the two jacks, a main shaft extending longitudinally of the platform and a gear connected to one end of each of said screw operating shafts, and a reversible motor geared to said main shaft.

3. In a weighing scale the combination with the platform and the balancing mechanism therefor, of a relieving gear for the latter comprising a plurality of screw jacks arranged in pairs beneath the scale platform at intervals along the length of the latter, the two jacks of each pair being located at opposite sides of the center line of the platform and each comprising a vertically movable plunger, a horizontally movable part and a link connection between the plunger and sliding part; the two jacks of each pair being so arranged that the two plungers will be moved in one direction by the movement of the sliding parts toward one another and will be moved in the opposite direction on a movement of the sliding parts away from one another, a common operating shaft for each pair of jacks having oppositely threaded portions in threaded engagement with the horizontally movable parts of said jacks, and mechanism for simultaneously rotating the various operating shafts.

4. In a weighing scale the combination with the platform and the balancing mechanism therefor, of a relieving gear for the latter comprising a plurality of screw jacks arranged in pairs beneath the scale platform at intervals along the length of the latter, the two jacks of each pair being located at opposite sides of the center line of the platform and each comprising a vertically movable plunger, a horizontally movable part formed with trunnions, and a separable link connecting said trunnions to said plunger, the two jacks of each pair being so arranged that the two plungers will be moved in one direction by the movement of the sliding parts toward one another and will be moved in the opposite direction on a movement of the sliding parts away from one another, a common operating shaft for each pair of jacks having oppositely threaded portions in threaded engagement with the horizontally movable parts of said jacks, and mechanism for simultaneously rotating the various operating shafts.

5. In a weighing scale the combination with the platform and the balancing mechanism therefor, of a relieving gear for the latter including a plurality of lifting jacks and means for simultaneously adjusting said jacks into and out of operative engagement with said platform, said means comprising a main jack operating shaft, a reversible motor, gearing connecting said motor and shaft and normally operative to effect a rotation of the shaft in one direction or the other according to the direction of operation of the motor, and means responsive to the resultant angular movement of said shaft for rendering said gearing inoperative to give further movement in the same direction to said shaft after the resultant movement of the shaft in either direction from a neutral condition has reached a predetermined maximum.

6. In a weighing scale the combination with the platform and the balancing mechanism therefor, of a relieving gear for the latter including a plurality of lifting jacks and means for simultaneously adjusting said jacks into and out of operative engagement with said platform, said means comprising a main jack operating shaft, a reversible motor, gearing connecting said motor and shaft comprising two ratchet mechanisms, one normally operative to effect a rotation of the shaft in one direction on a corresponding operation of the motor, and the other normally operative to effect a reverse rotation of the shaft when the motor is reversed, and means responsive to the angular movement of said shaft operating when a predetermined resultant movement of the shaft in either direction from a neutral position is reached to render inoperative the corresponding ratchet mechanism to prevent further movement of the shaft in the same direction.

7. In a weighing scale the combination with the platform and the balancing mechanism therefor, of a relieving gear for the latter including a plurality of lifting jacks and means for simultaneously adjusting said jacks into and out of operative engagement with said platform, said means comprising a main jack operating shaft, a reversible motor, a ratchet mechanism and a clutch forming a connecting gear normally operative to effect a rotation of the shaft in one direction on a corresponding operation of the motor, and a second ratchet mechanism and clutch forming a connecting gear normally operative to effect a reverse rotation of the shaft when the motor is reversed, and means responsive to the angular movement of said shaft operating when a predetermined resultant movement of the shaft in either direction from a neutral position is reached to disconnect the proper clutch to prevent further movement of the shaft in the same direction.

WILLIAM H. GRINDALL.

Copies of this patent may be obtained for five cents each, by addressing the "Commissioner of Patents, Washington, D. C."